3,416,728
INSULATED RAIL JOINTS
William R. Hamilton, Jr., Fairfield, Conn., assignor to Portec, Inc., a corporation of Delaware
Filed June 17, 1965, Ser. No. 464,631
2 Claims. (Cl. 238—152)

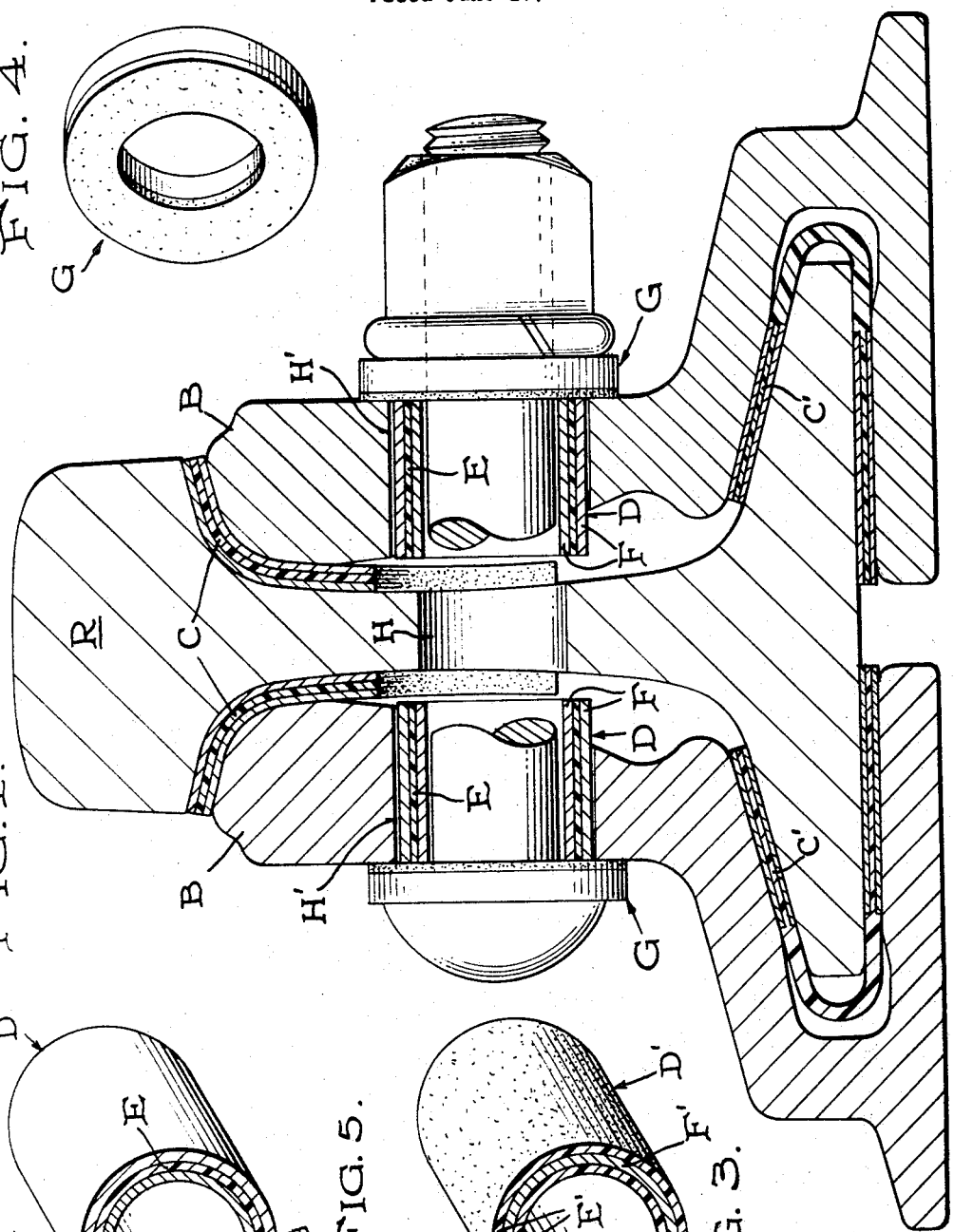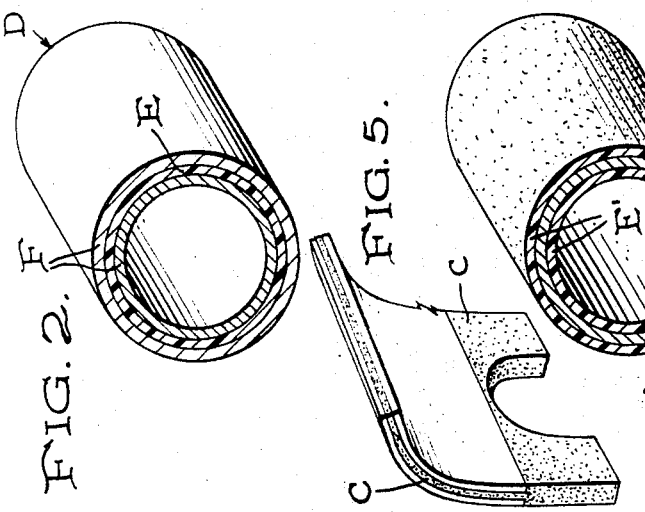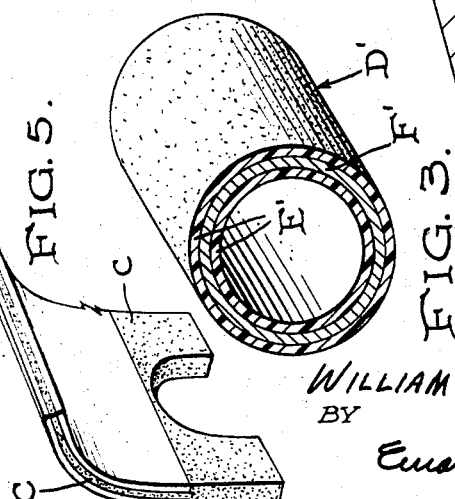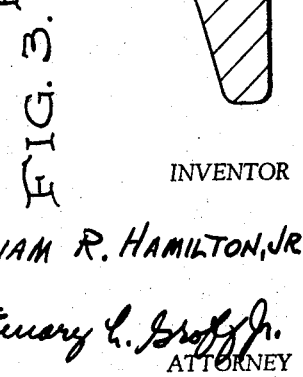
INVENTOR
WILLIAM R. HAMILTON, JR.
BY
ATTORNEY

United States Patent Office 3,416,728
Patented Dec. 17, 1968

ABSTRACT OF THE DISCLOSURE

A rail joint comprising, metal point bars retained on opposite sides of abutting rail sections by transversely disposed bolts and including a replaceable insulating component positioned between each bolt and joint bar, each component comprising a metal core to which is bonded a thermosetting resin layer.

---

This invention relates to insulated rail joints including component parts thereof made from materials including electrically insulating dimensionally stable non-metallic thermosetting resin and steel of the type used in insulated rail joints, said insulated rail joints being used, of course, in electric signal track sections.

Heretofore, to obviate the possibility of short circuiting the track through said joint bars, including the bolts therein utilized, it has been the practice to use a homogeneous hard vulcanized fiber bushing to fit over the shank of each bolt at the general location where it passes through the web of the rail or joint bar. Also, press-molded fiber washers have been used in conjunction with metal straps or washers. However, in each case this type of insulation material is subjected to deterioration factors such as exposure to moisture, water, temperature, and pressure changes with possibility of breakdown to the extent that the effectiveness of the insulated joint is impaired.

Accordingly, a primary object of the present invention is to provide insulated rail joints including annular composite articles including a metal reinforcement member and a bonded layer of a thermosetting resin, such as, for example, a dimensionally stable electrical insulating non-metallic thermosetting resin, an example thereof being an epoxy resin which is dimensionally stable and inherently electrically insulating. The patentably novel insulated rail joint of this invention is distinguished from prior art insulated rail joints, namely those utilizing component parts of fiber and rubber, by the inclusion therein of the composite steel and epoxy resin component parts which provide effective electrical insulation and dimensional stability, that is, the maximum structural rigidity, so that particularly when the rail and the joint bars contract from low temperatures and expand from high temperatures, for example, both pressures at the location of the bolt hole would prevent the insulation from crushing or mashing out.

In one form of the present invention, the insulated rail joint includes as the annular member a tube coated internally or externally, or both, with the electrically insulating dimensionally stable thermosetting resin, for example an epoxy resin, and, in the other form, as the annular member a washer coated on at least one face with such a bonded resin. In both cases, upon setting, said resins hardens. Therefore, the present invention provides a practical supplement to an insulated joint such for example as shown in Patent No. 3,154,250, dated Oct. 27, 1964.

With the above and other objects in view which will more readily appear as the nature of the invention is better understood, the invention consists in the novel construction, combination, and arrangement of parts hereinafter more fully described, illustrated and claimed.

A preferred and practical embodiment of the invention is shown in the accompanying drawing, in which:

FIG. 1 is a complete vertical sectional view of an insulated rail joint bar illustrating the present invention.

FIG. 2 is a perspective view of a component part of the insulated rail joint including the dimensionally stable electrical insulating thermosetting resin core having internal and external metal covering tubular portions as shown in FIG. 1.

FIG. 3 is a perspective view of a bushing component part with a metal core coated on both sides with such a resin.

FIG. 4 is a perspective view of a washer component part.

FIG. 5 is a perspective view of the top insulation member shown in FIG. 1.

Similar reference characters designate corresponding parts throughout the several figures of the drawing.

In the present invention, it is proposed to combine a metal sheath with an electrical insulating dimensionally stable thermosetting resin, as for example an epoxy resin. The steel and electrically insulating dimensionally stable resin in the set forth composite structure follow Hooke's Law, while in the prior are structures the combination of elastomeric material, such as natural or synthetic rubber, among other elastomeric materials, and steel do not follow Hooke's Law. The electrically insulating dimensionally stable resins herein contemplated and utilized, for example, epoxy resins, have substantially a coefficient of expansion value sufficiently close enough to the coefficient of expansion value of the steel herein utilized and likewise have a modulus of elasticity value comparable to that of steel, and said modulus of elasticity can be determined in the same manner as the modulus of elasticity value of steel with respect to the requirements of the completed insulated rail joint. Moreover, since the insulated rail joint including the component parts of this invention are used under all conditions of heat and moisture the components thereof must not only first follow Hooke's Law but they must also have substantially close enough and similar coefficients of expansion and contraction. In addition, it must be pointed out that the electrically insulating resin material is dimensionally stable when static loads and dynamic loads are applied thereto.

Referring to the drawing, it will be seen from FIG. 1 that the rail designated as R has it web provided with bolt holes such as the one designated as H to register with a related hole H' in the joint bar B. Top and bottom insulation members C and C', C being shown in FIG. 5, are disposed between the head and foot portions of the joint bar and each includes notch W for bolt passage therethrough.

One article designated generally as D in FIGS. 1 and 2, includes an internal sleeve E of electrically insulating dimensionally stable material which is sandwiched between and bonded to inner and outer concentric metal tubes F for maximum protection and rigidity.

According to FIG. 3, the tubular article D' has inner and outer layers of E' of said electrically insulating dimensionally stable material bonded to an internal metal tube F'.

Another article such as shown in FIGS. 1 and 4 includes a metal washer G coated on one side with an electrically insulating dimensionally stable layer which is bonded thereto on the side or face which will bear against the outer face of the joint bar.

In all cases, the layers or coatings of the electrically insulating dimensionally stable material may be applied to the tubular and annular articles in a fluid state in accordnce with the prior art, or they may be applied as a preformed carrier sheet or strip, which, in its dry marketable state, is available as a standard article of commerce.

Alternatively, the electrically insulating dimensionally stable material may be preformed to given shape and thickness and preferably, but not necessarily may include a screen fabric or other mesh reinforcement which assists in maintaining its shape during application and curing.

From the foregoing, it will now be seen that the present invention provides a practical and reliable insulated rail joint including component parts including bushings and washers, among others, thereby facilitating formation, handling and installation and making for an insulated rail joint superior in its insulating character.

I claim:
1. An insulated rail joint including a rail section, joint bars provided with holes, transverse bolts and a sleeve-like preassembled unitary insulating component disposed between said bolts and joint bars electrically and mechanically isolating said bolts from said joint bars, said insulating component comprising a pair of concentrically disposed and spaced apart metal tubes having opposed surface portions, a hardened layer of electrically insulating material between said spaced apart tubes bonded to said opposed surface portions of said metal tubes, said insulating material comprising a thermosetting resin, and the internal diameter of said component is greater than the outer diameter of said transverse bolts while the outer diameter of said component is less than the internal diameter of said bar holes, whereby said component may be removably disposed between said bolts and joint bars.

2. The insulated rail joint of claim 1 wherein the thermosetting resin is an epoxy resin.

References Cited
UNITED STATES PATENTS

| | | | |
|---|---|---|---|
| 3,006,553 | 10/1961 | Greer | 238—152 |
| 3,154,250 | 10/1964 | Lansing | 238—152 |

FOREIGN PATENTS

| | | |
|---|---|---|
| 882,568 | 7/1953 | Germany. |
| 514,464 | 11/1939 | Great Britain. |

ARTHUR L. LA POINT, *Primary Examiner.*

R. A. BERTSCH, *Assistant Examiner.*

U.S. Cl. X.R.

238—243.